US012447596B2

(12) United States Patent
Huelsmann

(10) Patent No.: US 12,447,596 B2
(45) Date of Patent: Oct. 21, 2025

(54) TOOL FOR MOUNTING A CHOPPING KNIFE ON A CHOPPING DRUM

(71) Applicant: MASCHINENFABRIK BERNARD KRONE GMBH & CO. KG, Spelle (DE)

(72) Inventor: Michael Huelsmann, Voltlage/Weese (DE)

(73) Assignee: MASCHINENFABRIK BERNARD KRONE GMBH & CO. KG, Spelle (DE)

( * ) Notice: Subject to any disclaimer, the term of this patent is extended or adjusted under 35 U.S.C. 154(b) by 0 days.

(21) Appl. No.: 18/789,711

(22) Filed: Jul. 31, 2024

(65) Prior Publication Data

US 2025/0065479 A1 Feb. 27, 2025

(30) Foreign Application Priority Data

Aug. 8, 2023 (DE) ..................... 10 2023 121 066.1

(51) Int. Cl.
*B25B 27/14* (2006.01)
*B02C 18/18* (2006.01)

(52) U.S. Cl.
CPC .............. *B25B 27/14* (2013.01); *B02C 18/18* (2013.01)

(58) Field of Classification Search
CPC ....... B25B 27/14; B02C 18/18; A01F 29/095; A01F 29/06; A01D 43/08; A01D 75/12
See application file for complete search history.

(56) References Cited

U.S. PATENT DOCUMENTS

2007/0158478 A1* 7/2007 Stager .................. B27L 11/005
241/293

FOREIGN PATENT DOCUMENTS

DE 20 2010 006 714 U1 9/2010
DE 10 2013 011 088 B4 1/2016

* cited by examiner

*Primary Examiner* — Lee A Holly
(74) *Attorney, Agent, or Firm* — Norman B. Thot

(57) ABSTRACT

A tool for mounting a chopping knife to a chopping drum. The tool includes a clamping mechanism for releasably fixing the tool in an auxiliary bore of the chopping drum, a frame, an adjusting element, and a positioning element. The clamping mechanism is reversibly adjustable from a basic state, in which the clamping mechanism is unclamped, to a clamping state, in which the clamping mechanism is clamped. The adjusting element is reversibly displaceable relative to the clamping mechanism and/or the frame in a displacement direction along a displacement axis. The adjusting element reversibly adjusts the clamping mechanism from the basic state to the tensioned state. The positioning device positions the chopping knife on the chopping drum.

22 Claims, 5 Drawing Sheets

TOOL FOR MOUNTING A CHOPPING KNIFE ON A CHOPPING DRUM

CROSS REFERENCE TO PRIOR APPLICATIONS

Priority is claimed to German Patent Application No. DE 10 2023 121 066.1, filed Aug. 8, 2023. The entire disclosure of said application is incorporated by reference herein.

FIELD

The present invention relates to a tool for mounting a chopping knife on a chopping drum. The present invention further relates to a method for mounting a chopping knife on a chopping drum via such a tool.

BACKGROUND

For shredding harvested material, harvesting machines regularly use units comprising a rotationally driven chopping drum with chopping knives distributed around the circumference and a counter-blade interacting with the chopping knives. The chopping knives are usually detachably attached to a knife holder of the chopping drum, in particular by screwing. It is also known to fix the knife holder to the chopping drum in a fixed position, for example, via welding.

In addition to the sharpness of the cutting edge of the chopping knife, a cutting gap between a counter blade and the chopping knife is also essential for the cutting result when harvesting. If the cutting gap is too large, the crop can be crushed during cutting and damaged as a result. Blockages can also occur. For an accurate cut, the cutting gap should be as consistently small as possible for all chopping knives on the chopping drum and along their respective cutting edges.

Due to the large number of chopping knives on the chopping drum, it is difficult to fit all chopping knives with the same cutting gap to the counter blade. This is made even more difficult by the fact that the chopping knives are usually arranged in a V-shape on the chopping drum so that the cutting edges of the chopping knives are only selectively at the same height as the counter blade. In order to align the cutting edges with the counter blade over their entire length, the chopping drum is therefore traditionally rotated back and forth manually several times during alignment. Such a procedure is time-consuming and carries the risk of injury for a fitter if handled incorrectly. The success of this procedure also depends heavily on the skills and experience of the technician.

The chopping knives become blunt during use and must regularly be resharpened by a grinding device. As the chopping knives are shortened by the material removal during the grinding process, the cutting gap must be adjusted to an optimum size after each grinding process. For this purpose, the counter blade is regularly designed to be adjustable in the direction of a fictitious enveloping cylinder described by the cutting edges of the chopping knives.

If not all chopping knives have the same cutting gap, a chopping knife that protrudes further outwards after installation will be ground back more by the grinding device than a chopping knife that protrudes less outwards. This leads to an unnecessary and uneven wear of the chopping knives. It also results in increased consumption of abrasives for the grinding device.

DE 20 2010 006 714 U1 describes an auxiliary tool for aligning a chopping knife relative to the counter blade. To use the auxiliary tool, the chopping knife has a recess in which an eccentric pin of the auxiliary tool can be accommodated. Turning the auxiliary tool causes the chopping knife to be adjusted via the eccentric pin. This allows the chopping knife to be moved with precision. Due to the V-shaped arrangement of the chopping knife on the chopping drum, it is nevertheless necessary to rotate the chopping drum forwards and backwards several times in order to align the cutting edge essentially consistently with the counter blade over its entire length.

SUMMARY

An aspect of the present invention is to provide the initial mounting of chopping knives on a chopping drum in a precise and user-friendly manner so that the cutting gap of each of the chopping knives to the counter blade is essentially the same and constant along their respective cutting edges, and the service life of the chopping knives is thereby increased. A further aspect of the present invention is to enable the chopping knife to deflect so that the chopping knife, in particular the cutting edge thereof, is damaged as little as possible when struck by a foreign object such as a stone.

In an embodiment, the present invention provides a tool for mounting a chopping knife to a chopping drum. The tool comprises a clamping mechanism for releasably fixing the tool in an auxiliary bore of the chopping drum, a frame, an adjusting element, and a positioning element. The clamping mechanism is configured to be reversibly adjustable from a basic state, in which the clamping mechanism is unclamped, to a clamping state, in which the clamping mechanism is clamped. The adjusting element is reversibly displaceable relative to at least one of the clamping mechanism and the frame in a displacement direction along a displacement axis. The adjusting element is configured to reversibly adjust the clamping mechanism from the basic state to the tensioned state. The positioning device is configured to position the chopping knife on the chopping drum.

BRIEF DESCRIPTION OF THE DRAWINGS

The present invention is described in greater detail below on the basis of embodiments and of the drawings in which.

DETAILED DESCRIPTION

Figure 1:
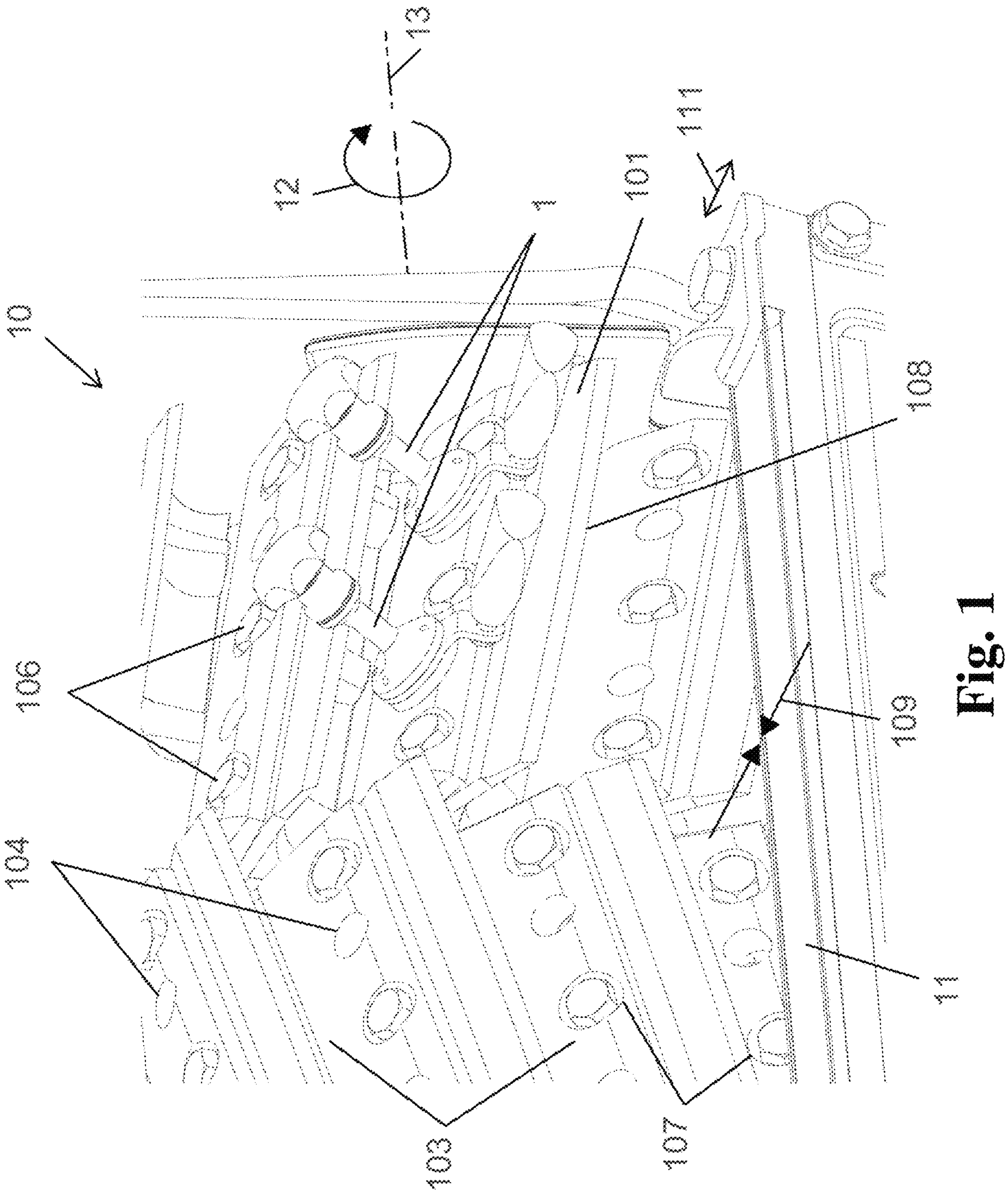
FIG. 1 shows a schematic section of an arrangement comprising a chopping unit and a tool according to the present invention in a first embodiment.

The present invention provides a tool for mounting a chopping knife on a chopping drum. The tool includes:

- a clamping mechanism for releasably fixing the tool in an auxiliary bore of the chopping drum, the clamping mechanism being reversibly adjustable from a basic state, in which it is unclamped, to a clamping state, in which it is clamped;

a frame;

an adjusting element which is reversibly displaceable relative to the clamping mechanism and/or to the frame in a displacement direction along a displacement axis and is provided for reversibly adjusting the clamping mechanism from the basic state to the clamping state; and a positioning device which is provided for positioning the chopping knife on the chopping drum.

The tool is designed to simplify the initial fitting of a new, i.e., still unused, chopping knife to the chopping drum. For this purpose, the tool has the positioning device, which can be adjusted from the basic state to the clamping state in a defined position by adjusting the clamping mechanism. The positioning device is intended to interact with the chopping knife so that the chopping knife pre-mounted on the chopping drum is positioned in a mounting position by adjusting the clamping mechanism on the chopping drum. The defined position of the positioning device is selected so that the cutting edge of the chopping knife lies on a fictitious enveloping cylinder with a constant radius cylindrically surrounding the chopping drum after its final assembly. When using the tool for all the chopping knives of the chopping drum, the cutting edges of all the chopping knives lie essentially uniformly on the fictitious enveloping cylinder. The wording “essentially” here takes into account manufacturing tolerances of the chopping knives and/or the chopping drum, in particular of knife holders of the chopping drum.

The distance between the chopping knives of the chopping drum and the counter blade is thereby essentially the same along their cutting edge and for all chopping knives after their final assembly with the tool. After final assembly, the chopping knives therefore hardly need to be sharpened before the chopping drum is put into operation. The grinding process, i.e., the number of grinding cycles required, is therefore minimized by using the tool during the initial assembly of the chopping knives and the service life of the chopping knives is accordingly increased.

For this purpose, the clamping mechanism of the tool can, for example, be detachably fixed in an auxiliary bore of the chopping drum, which is designed as a through bore, by inserting it into the auxiliary bore and then adjusting it from the unclamped basic state to the clamped clamping state. The clamping mechanism is used to clamp the tool firmly in the auxiliary bore in the clamped state. By resetting the clamping mechanism from the clamped state to the basic state, the tool can again be released from the chopping drum, in particular after the final assembly of the chopping knife, in particular in a non-destructive manner.

The adjusting element is provided for adjusting the clamping mechanism from the basic state to the clamping state. The adjusting element can be reversibly displaced in a displacement direction along a displacement axis relative to the clamping mechanism and/or the frame. Alternatively or additionally, the adjusting element can also be designed to rotate about an axis of rotation. The adjusting element thereby interacts with the clamping mechanism so that the clamping element can be adjusted with the adjusting element from the basic state to the clamping state and back. The clamping mechanism can be formed in one piece with the frame.

In an embodiment, the adjusting element can, for example, be arranged on a shaft. The shaft can, for example, pass at least partially through the clamping mechanism.

In an embodiment, the positioning device can, for example, be arranged at a first end of the adjusting element which projects beyond the clamping mechanism. This allows the positioning device to interact with a counter-positioning device of the chopping knife when the chopping knife is pre-assembled, so that the chopping knife can be brought into the defined position. The counter-positioning device can, for example, be a recess which is explicitly provided therefor in the chopping knife, for example, a positioning hole. The positioning device and the counter-positioning device can, for example, be designed to correspond to one another in terms of their dimensions and their shape so that they can be easily inserted into one another and enable a very precise positioning of the chopping knife when the positioning device engages in the counter-positioning device and is arranged in the defined position. In an embodiment, the positioning device can, for example, be designed as a mandrel, for example, as a cylindrical mandrel, and the counter-positioning device can, for example, be designed as a recess, for example, as a cylindrical recess, in particular as a through-hole.

In an embodiment, the tensioning mechanism can, for example, form the positioning device. In this embodiment, the clamping mechanism interacts with the counter-positioning device of the chopping knife in order to bring the chopping knife into the defined position. For this purpose, the clamping mechanism and the counter-positioning device can, for example, be designed to correspond to one another in terms of their dimensions and shape so that they can be easily inserted into one another and enable a very precise positioning of the chopping knife in the clamping state when the clamping mechanism engages in the counter-positioning device.

The clamping mechanism can, for example, have at least two clamping elements, with at least one of the clamping elements being adjustable relative to the displacement axis. When adjusting the clamping mechanism from the unclamped basic state to the clamped clamping state, the adjustable clamping element can, for example, be adjusted so that its distance from the displacement axis is at least partially increased. When the clamping mechanism engages in the auxiliary bore of the chopping drum, the adjustable clamping element is adjusted in the direction of an inner wall bounding the auxiliary bore when the clamping mechanism is adjusted from the unclamped basic state to the clamped clamping state. As a result, the clamping elements are pressed against the inner wall and the clamping mechanism is clamped in the auxiliary bore. This also moves the positioning device arranged on the adjusting element into the defined position.

In an embodiment, all clamping elements of the clamping mechanism can, for example, be adjustable relative to the displacement axis. The shaft and/or the clamping mechanism, in particular the clamping elements, of this embodiment can, for example, be arranged concentrically to the displacement axis. In this embodiment, the positioning device and/or the adjusting element can, for example, also be arranged concentrically to the displacement axis. The shaft, the adjusting element, and/or the positioning device can, for example, be rotationally symmetrical. The shaft, the adjusting element, and/or the positioning device can also be manufactured in one piece. These components can therefore be manufactured as a turned part at low cost and with a comparatively high tolerance quality.

The clamping elements can, for example, be identical in construction. They can, for example, be spaced out evenly in a circumferential direction around the displacement axis. A distance between the clamping elements can, for example, be at least partially smaller in the basic state than in the clamping state.

In an embodiment, the clamping elements can, for example, be connected to each other at a common flange part. The clamping elements thereby maintain their distance from each other on the common flange part when the clamping mechanism is adjusted from the basic state to the clamping state. The clamping elements are then pressed apart at their end opposite the flange part so that their distance there increases when the clamping mechanism is adjusted from the basic state to the clamping state. In an embodiment of the clamping mechanism, the clamping elements are not, for example, connected to each other by a common flange part. In this embodiment, the clamping elements can move evenly in relation to each other when the clamping mechanism is moved from the basic state to the clamping state or back.

The shaft can, for example, be arranged in the center of the clamping mechanism. The shaft can, for example, pass through the center of the clamping mechanism. By adjusting the clamping mechanism from the basic state to the clamping state, the shaft can be centered in the auxiliary bore in this embodiment of the tool. In the clamping state, the positioning device and the counter-positioning device are then aligned with the auxiliary bore. The position of the positioning device is therefore always the same when the clamping mechanism is clamped in the auxiliary bore regardless of the angle of rotation of the tool about the displacement axis. The shaft can, for example, pass completely through the clamping mechanism. This makes the tool particularly easy to operate.

In an embodiment, the adjusting element can, for example, be conical in shape. In an embodiment, the adjusting element can, for example, taper in or towards the direction of displacement. Depending on the positioning of the adjusting element on the shaft, i.e., depending on whether the adjusting element is arranged in front of or behind the clamping mechanism in the direction of displacement, the adjustable clamping element or the clamping elements are pushed apart with the adjusting element either in or against the direction of displacement due to the conical shape of the adjusting element. This at least partially increases its or their distance from the shaft and/or from each other. When the clamping mechanism engages in the auxiliary bore of the chopping drum, the adjustable clamping element or the adjustable clamping elements is thereby pressed against the inner wall and the clamping mechanism is thus braced in the auxiliary bore.

In an embodiment, the adjusting element can, for example, be elliptical. In this embodiment, the adjusting element and/or the shaft can, for example, be rotated in one direction of rotation. The adjusting element can also be designed to be displaceable in the direction of displacement. The adjusting element in this case comes into contact with the adjustable or the clamping elements. This moves the clamping mechanism from the basic state to the clamping state. The clamping mechanism of this embodiment can be reset from the clamping state to the basic state by turning back the shaft.

In an embodiment, the adjusting element for each clamping element can, for example, have a circumferential area with a radius that increases in relation to the adjustment axis. In this embodiment, the adjusting element can, for example, be rotated in the direction of rotation. The adjusting element can also be designed to be displaceable. The adjusting element is in this case rotated, in particular with the shaft. The circumferential areas of the adjusting element with the increasing radius come into contact with the associated clamping elements during the rotation. This moves the clamping mechanism from the basic state to the clamping state. By turning the shaft back, the clamping mechanism of this embodiment can be reset from the clamping state to the basic state.

The tool can, for example, comprise a manually operable actuator which is provided for moving the adjusting element relative to the frame. The clamping mechanism is therefore actuated with the actuating element, i.e., moved from the basic state to the clamping state or back. The actuator can, for example, be arranged on a side of the adjusting element facing away from the first end of the adjusting element. The actuator can, for example, be arranged at a second end of the shaft facing away from the adjusting element.

In an embodiment, the actuator can, for example, have a thread that interacts with a mating thread on the shaft so that the shaft is displaced in the direction of displacement when the actuator is rotated in or against a direction of rotation. To this end, the shaft can, for example, be secured against twisting relative to the frame. The anti-rotation lock prevents the shaft from rotating with the actuator. By turning the actuator, the adjusting element is moved with the shaft in the direction of displacement and the clamping mechanism is therefore adjusted from the basic state to the clamping state.

The actuator can, for example, be designed as a rotary knob, in particular a rotary knob that is mounted to rotate in and against the direction of rotation about an axis of rotation. The axis of rotation of the actuator can, for example, be the displacement axis of the shaft. The rotary knob can then be arranged in alignment with the axis of displacement and the shaft. A handling of the tool is very easy in that the tool is arranged at the second end of the shaft opposite to the first end of the adjusting element at which the positioning device is arranged.

In an embodiment, the actuator can, for example, be designed as a lever, in particular a lever that is mounted to rotate in and against the direction of rotation about an axis of rotation. The lever can have a switching mechanism, for example, a ratchet, which in a first position causes a displacement of the shaft in or against the direction of displacement when the lever is turned back and forth, and in a second position causes a displacement in the opposite direction when the lever is turned back and forth.

Both embodiments of the actuator provide a simple manual adjustment of the clamping mechanism. A clamping force of the clamping mechanism, with which the tool is fixed in the auxiliary bore, can be dosed by manually turning the actuator.

The tool can, for example, have a holding device for holding the tool during an actuation of the actuator. The holding device can, for example, be arranged at a distance from the actuator and fixed to the frame. The holding device can be used to hold the tool with one hand while the fitter operates the actuator with the other hand. In the embodiment in which the actuator is designed as a rotary knob, the holding device can, for example, be designed as a lever-shaped handle. In the embodiment in which the actuator is designed as a lever, the holding device can, for example, be designed as a button-shaped handle. In an alternative embodiment or additionally, the tool can also be supported on the frame during actuation of the actuator. Handling the tool is, however, easier with the aid of the holding device.

In an embodiment, the tool can, for example, have an actuator with which the adjusting element and/or the shaft can be displaced. In this embodiment, the tool can have an electrical control element that serves as an actuator for controlling the actuator. Such an operating element can, for example, be designed as a button, a switch or a handwheel.

The present invention also provides an arrangement comprising such a tool and a chopping drum for chopping harvested material. The chopping drum has at least one knife holder to which a chopping knife can be mounted, in particular screwed on. The knife holder also has the auxiliary bore for inserting the clamping mechanism of the tool, and the chopping knife has a counter-positioning device for inserting the positioning device of the tool.

With the chopping knife pre-mounted on the knife holder, the clamping mechanism can be inserted into the auxiliary bore, whereby the positioning device engages in the counter-positioning device. For this purpose, the diameter of the clamping mechanism in the basic state is smaller than the diameter of the auxiliary hole. Pre-assembled here means that the chopping knife is (still) loosely, in particular (still) slidably, mounted on the knife holder. The positioning device can be moved into the defined position by tightening the clamping mechanism. This causes the pre-mounted chopping knife to move relative to the knife holder.

Since the clamping mechanism is fixed in the knife holder in the clamped state, the chopping knife can no longer move when the chopping knife is subsequently fixed, in particular screwed, to the knife holder and thus retains a mounting position caused by the positioning device.

The tool is used to provide that a cutting gap between the chopping knife and a counter blade along a cutting edge of the chopping knife remains constant. Two such tools can, for example, be used to mount one chopping knife at a time therefor. The knife holder can, for example, have two spaced-apart auxiliary bores for this purpose, with the chopping knife having two counter-positioning devices spaced apart at the same distance. By using the two tools simultaneously when mounting the chopping knife, a constant cutting gap can be achieved with repeatable case and precision. An initial mounting of the chopping knife on the chopping drum is therefore very simple. There is also no longer any need to turn the chopping drum back and forth in order to achieve the same cutting gap over the lengths of the cutting edges of the chopping knives. This considerably reduces the risk of injury to the fitter.

The chopping drum can, for example, have a plurality of such knife holders, to each of which one such chopping knife can be mounted. By using two such tools, the initial assembly of all the chopping knives can be carried out precisely and quickly, in particular without having to turn the chopping drum back and forth several times. Due to the very precise positioning and alignment of the chopping knives, the cutting edges of the chopping knives lie on the fictitious enveloping cylinder after their final assembly. This means that it is hardly necessary to grind the chopping knives during a final grinding process, so that the service life of the chopping knives is significantly increased compared to a service life with conventional initial assembly of the chopping knives.

The present invention also provides a method for mounting a chopping knife on a chopping drum, in which the chopping knife is positioned on the chopping drum with a first above-described tool and is then fixed, in particular screwed, to the chopping drum, in particular to a knife holder of the chopping drum, the tool then being released from the chopping drum. The tool can then be removed from the chopping drum without tension and thus in a very user-friendly manner.

The use of the tool provides that the distance between the chopping knife and the counter blade is essentially the same along the entire cutting edge of the chopping knife. The number of grinding cycles required before the first use of the chopping knife is therefore low and the service life of the chopping knife is long.

The tool is furthermore completely detached from the chopping drum after the chopping knife has been fixed. Positioning takes place completely without additional components such as pins. This allows the chopping knife to avoid hitting a foreign object such as a stone. This significantly reduces the risk of severe damage or even destruction of the chopping knife by an impacting foreign object.

The present invention also provides a method for mounting a chopping knife on a chopping drum with a first such tool. For this purpose, the chopping drum has at least one knife holder, wherein the chopping knife can be mounted, in particular screwed, to the knife holder. The knife holder also has a first auxiliary bore and the chopping knife has a first counter-positioning device. The method comprises the steps:

a. Inserting a clamping mechanism of the first tool into the first auxiliary hole, the clamping mechanism being in a basic state so that a positioning device of the first tool engages with the first counter-positioning device of the chopper blade; and
b. Transferring the clamping mechanism of the first tool from the basic state to a clamping state, wherein the clamping mechanism of the first tool is clamped in the first auxiliary bore and the positioning device of the first tool is adjusted, in particular centered, relative to the first auxiliary bore to a defined position.

In the basic state, the distance between the clamping elements of the clamping mechanism is small relative to one another. In an embodiment, the clamping elements can, for example, lie against each other in the basic state, in particular flat. The clamping mechanism can be inserted into the first auxiliary bore of the knife holder as a result, in particular without friction, so that the positioning device of the first tool engages in the first counter-positioning device of the chopping knife. By adjusting the clamping mechanism from the basic state to the clamping state, a distance between the clamping elements is at least partially increased until the clamping elements are at least partially in contact with an inner wall of the auxiliary bore and the clamping mechanism is clamped in the auxiliary bore. When the distance between the clamping elements is increased relative to each other, the adjusting element and/or the shaft, and thus the positioning device, move so that the chopping knife is displaced. If the clamping mechanism and the shaft are arranged concentrically around the displacement axis, the adjusting element and/or the shaft is centered in the auxiliary bore. By clamping the clamping mechanism in the auxiliary bore, the tool is fixed form-fit or force-fit to the knife holder. The positioning device is arranged in the defined position when the clamping mechanism is clamped in the auxiliary bore. As the positioning device engages with the counter-positioning device, the chopping knife is moved, in particular displaced, into the mounting position.

The chopping knife need not be moved back and forth to align it, which is time-consuming in the conventional way. This means that the chopping knives can not only be fitted very precisely, but also very quickly. The chopping knife can also be fitted with the tool by less experienced and/or trained fitters.

The chopping knife can, for example, be pre-assembled on the knife holder before the clamping mechanism is inserted into the auxiliary bore. In this context, pre-assembled means that the chopping knife is still mounted on the knife holder so that its position can be changed at least slightly, in particular so that it can be moved. This means that the chopping knife can still be moved into its mounting position with the aid of the tool, in particular without great effort. The auxiliary bore of the knife holder and the counter-positioning device of the pre-assembled chopping knife can, for example, be arranged to overlap each other at least slightly in the pre-assembled state. This allows the positioning device to be easily inserted into the counter-positioning device. The pre-assembly of the chopping knife means that the fitter has both hands free while using the tool, making it easy for the fitter to use the tool.

Depending on the position of the auxiliary bore and the counter-positioning device, the chopping knife is aligned centrally or laterally by using the first tool. Depending on the shapes of the knife holder and/or the chopping knife, in particular the presence of one or more stop elements for aligning the chopping knife, the use of only one tool may be sufficient when mounting the chopping knife.

Conventional chopping knives are, however, elongated and are also attached to the chopping drum at an angle to its axis of rotation. The chopping knife can also, for example, avoid hitting an obstacle such as a stone during operation of the chopping drum so that it is not damaged. No pins or stop elements can, for example, be provided for aligning the chopping knife.

In order to nevertheless align the chopping knife along its entire cutting edge on a fictitious enveloping cylinder around the axis of rotation of the chopping drum, two tools can, for example, be used for mounting. The tools can, for example, be arranged at opposite ends of the chopping knife during assembly.

In an embodiment, such a second tool can, for example, be used to mount the chopping knife, wherein the knife holder has a second auxiliary bore and the chopping knife has a second counter-positioning device, the method comprising the following further steps:

- c. Inserting the clamping mechanism of the second tool into the second auxiliary hole so that the positioning device of the second tool engages with the second counter-positioning device of the chopper blade; and
- d. Transferring the clamping mechanism of the second tool from the basic state to the clamping state, whereby the clamping mechanism of the second tool is clamped in the second auxiliary bore and the positioning device of the second tool is adjusted, in particular centered, relative to the second auxiliary bore to a defined position.

The second tool is therefore used in the same way as the first tool to align the chopping knife. The chopping knife can, for example, be aligned with the second tool at an end of the chopping knife opposite the first tool. The chopping knife is thereby optimally arranged on the knife holder so that its cutting edge is essentially arranged on the fictitious enveloping cylinder surrounding the axis of rotation of the chopping drum.

The chopping knife can, for example, then be fixed to the knife holder. In an embodiment, the chopping knife can then, for example, be bolted to the knife holder. By using the tools, the chopping knife can be prevented from twisting or shifting when the chopping knife is screwed tight.

The use of screws for fixing the chopping knife to the knife holder has the advantage that these can again be removed from the knife holder, in particular with conventional wrenches, and the chopping knife can therefore be quickly replaced. The use of screws also has the advantage that the displacement of the chopping knife can be adjusted relatively sensitively during pre-assembly. This simplifies assembly.

Both tools can, for example, be released from the chopping drum after the chopping knife has been fixed by transferring the respective clamping mechanism from the clamping state to the basic state. Advantageously, this also releases a tension between the tool, the knife holder, and/or the chopping knife, which can occur due to the setting behavior of the chopping knife during final assembly. The positioning device remains on its respective tool so that no further components are required for positioning the chopping knives. The tools can then be used for mounting another chopping knife.

The advantage of this method is that the fitter can install the chopping knife without manually moving the chopping knife and/or turning the chopping drum back and forth. The installation can therefore be carried out very quickly and accurately, and the risk of injury to the fitter is low.

The present invention is described below with reference to the drawings. The drawings are thereby merely exemplary and do not limit the general idea of the present invention.

FIG. 1 schematically shows a section of a chopping unit comprising a chopping drum 10, which can rotate about an axis of rotation 13 in a direction of rotation 12, and a counter blade 11. The chopping drum 10 has a plurality of knife holders 103, on each of which a chopping knife 101 is mounted. To illustrate a mounting of one of the chopping knives 101, two tools 1 according to the present invention of a first embodiment are arranged at a distance from one another on one of the knife holders 103.

The chopping unit 10 is intended for shredding harvested material. The chopping unit 19 can therefore, for example, be used in a forage harvester.

In order to be able to detach the chopping knives 101 from the knife holder 103 and replace them, the chopping knives 101 are each attached to their knife holder 103 via screws 106. The knife holders 103 have through-bores 107 to accommodate the screws 106.

The counter blade 11 is arranged parallel to the axis of rotation 13 of the chopping drum 10 and interacts with a cutting edge 108 (see FIG. 4) of the chopping knives 101 when the chopping unit is in operation. During operation, the chopping drum 10 rotates in the direction of rotation 12 around the axis of rotation 13 and shreds crop material between the counter blade 11 and the cutting edge 108.

In order to achieve a clean cut without crushing the crop, the setting of a cutting gap 109 between the counter blade 11 and the cutting edge 108 of the chopping knives 101 is decisive. To set the cutting gap 109, the counter-blade 11 can be adjusted in and against an adjustment direction 111 relative to the chopping drum 10.

In order to prevent a chopping knife 101 from striking the counter blade 11 during operation of the chopping drum 10, the cutting gap 109 of all chopping knives to the counter blade 11 and along their respective cutting edges 108 must be the same. This is conventionally achieved by grinding all chopping knives 101 and adjusting the counter blade 11 before starting up the chopping drum 10. After grinding, the cutting edges 108 of the chopping knives 101 lie on a fictitious enveloping cylinder (not shown) around the axis of rotation 13 of the chopping drum 10.

The chopping unit comprises a grinding device (not shown) therefor. Grinding takes place not only before the chopping drum 10 is put into operation for the first time, in particular after a chopping knife replacement, but also regularly during a harvesting operation in order to resharpen the chopping knives 101 and to optimize the cutting gap 109 by adjusting the counter blade 11 in and against the adjustment direction 111. The grinding device can be designed in a manner known per se and is therefore not here further described.

The chopping knives 101 are each arranged at an angle (not shown) to the axis of rotation 13 on the chopping drum 10. The chopping knives 101 are evenly distributed around the chopping drum 10 in a circumferential direction (not shown). Adjacent chopping knives 101 in the direction of the axis of rotation 13 are offset in the circumferential direction by an angle of rotation (not shown) and arranged in a V-shape relative to one another. This arrangement enables a scissor-like cut of the crop between the cutting edge 108 and the counter blade 11. This means, however, that only one point of each chopping knife 101 is always at the level of the counter blade 11 when the chopping drum 10 is in operation. A manual alignment of the chopping knives 101 on the counter blade 11, which results in a cutting gap 109 that is as equal as possible everywhere, therefore requires the chopping drum 10 to be rotated back and forth several times about the axis of rotation 13 for each chopping knife 101 during assembly. This is not only time-consuming and difficult for a technician, it also involves a high risk of injury.

With an unequal cutting gap 109 between the chopping knives 101 and the counter blade 11, chopping knives 101 arranged closer to the counter blade 11 are also ground more strongly by the grinding device than chopping knives 101 spaced further apart. Inaccurate manual alignment of the chopping knives 101 therefore leads to unevenly ground chopping knives and a correspondingly reduced service life.

The tools 1 enable the mounting of all chopping knives 101 with the same cutting gap 109. They are each arranged in an auxiliary bore 104 of the knife holder 103 provided for mounting, to which the chopping knife 101 is to be mounted.

Two identical tools 1 for mounting the chopping knife 101 are shown. The tools 1 are both attached to the same knife holder 103. A chopping knife 101 is mounted below the knife holder 103 via screws 106. The knife holder 103 has through-bores 107 to accommodate the screws 106. So that the chopping knife 101 can be moved, the chopping drum 10 comprises a counter element 105 (see (d) of FIG. 2), into which one or more screws 106 can be screwed. The counter element 105 can, for example, be a separate component and is mounted below the chopping knife 101 during assembly.

Figure 2:
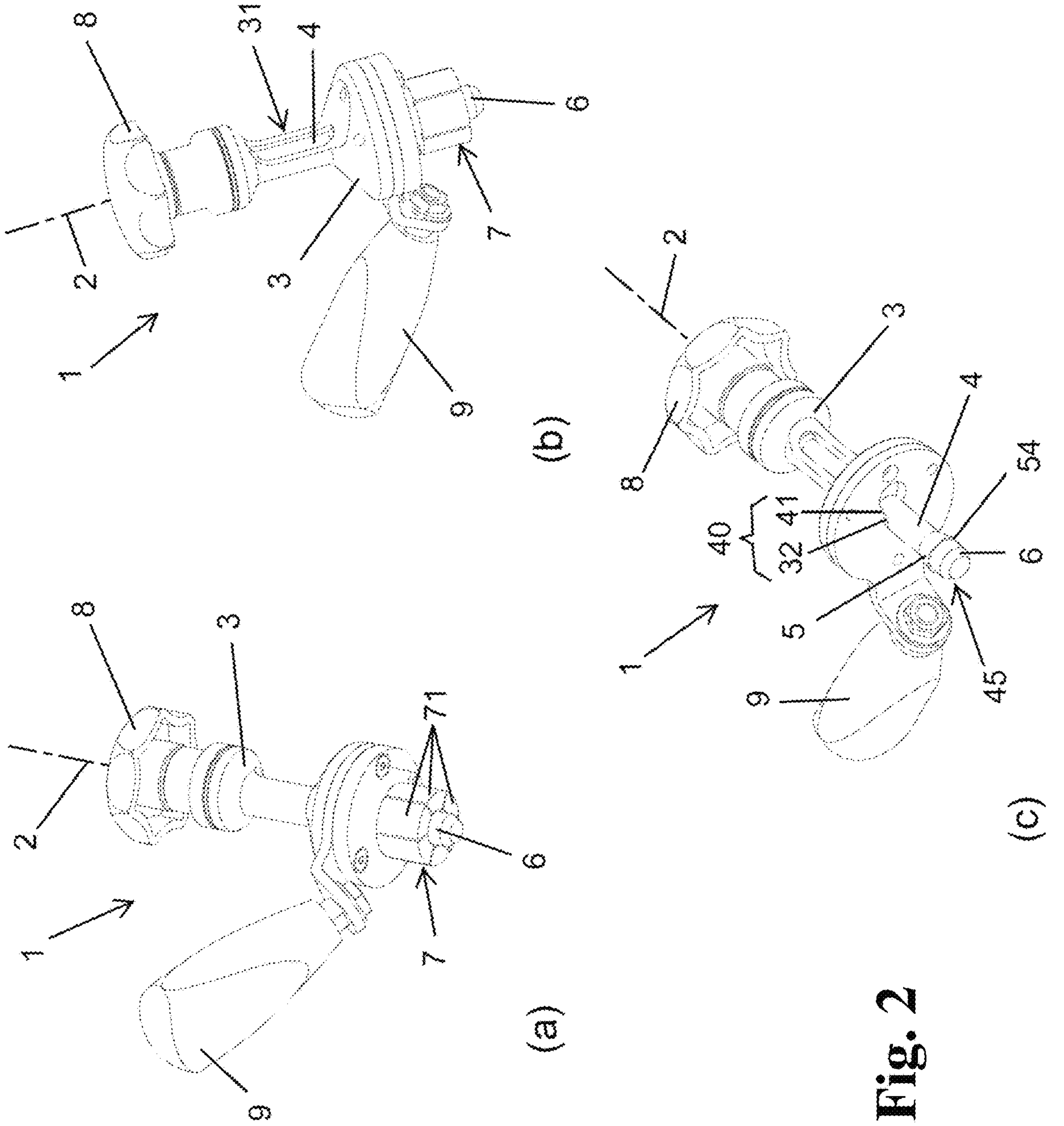
FIG. 2 schematically shows different perspective views in (a) to (c), and shows a sectional view in (d), of the tool of FIG. 1.
Figure 2:
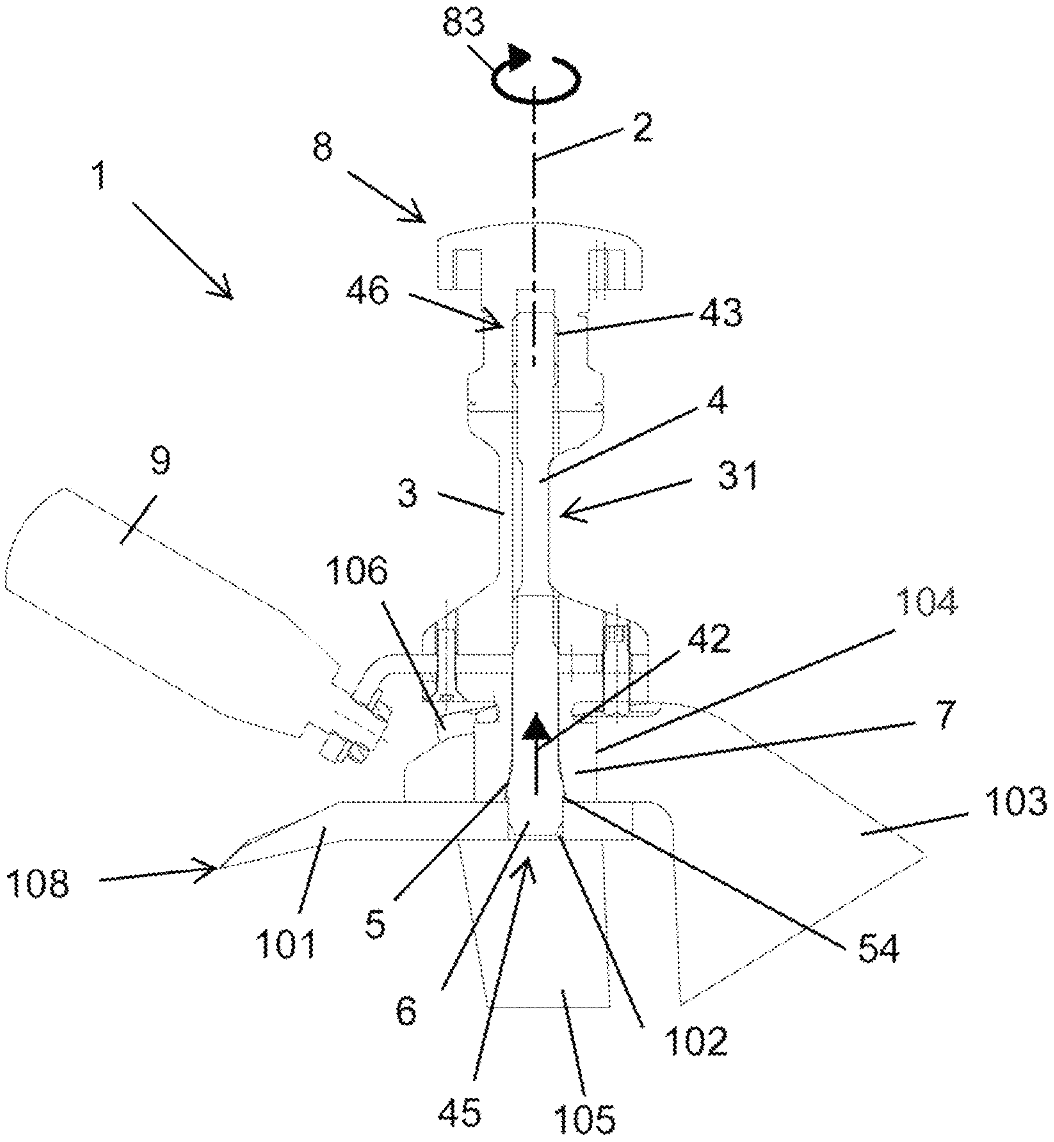

FIG. 2 shows schematically in (a) to (c) different perspective views of the tools 1 of FIG. 1.

The tool 1 has a clamping mechanism 7 which is provided for releasably fixing the tool 1 in the auxiliary bore 104 of the knife holder 103 of the chopping drum 10. The clamping mechanism 7 can be reversibly adjusted from a basic state, in which it is unclamped, to a clamping state, in which it is clamped. When a chopping knife 101 is fitted, the clamping mechanism 7 is transferred to the clamping state so that the clamping mechanism 7 is firmly clamped in the auxiliary bore 104. By resetting the clamping mechanism 7 from the clamping state to the basic state, the tool 1 can be released from the chopping drum 10 again after the final assembly of the chopping knife 101.

The tool 1 has a frame 3 and a shaft 4, wherein the frame 3 at least predominantly surrounds the shaft 4. The frame 3 has a recess 31 which enables the tool 1 to be positioned on the knife holder 103 of the chopping knife 101 currently to be mounted if a previously mounted chopping knife 101 is already arranged in front of the chopping knife 101 currently to be mounted with the tool 1 in the direction of rotation 12 of the chopping drum 10. Depending on the installation space, tools 1 can also be used without such a recess 31 in the frame 3.

The shaft 4 is reversibly displaceable relative to the frame 3 in a displacement direction 42 along a displacement axis 2.

The tool 1 also has an adjusting element 5, which is here arranged on the shaft 4. The adjusting element 5 is provided for reversible adjustment of the clamping mechanism 7 from the basic state to the clamping state. The adjusting element 5 is conical in shape and tapers in the displacement direction 42. When the shaft 4 is displaced, the adjusting element 5 is displaced therewith relative to the clamping mechanism 7 and/or to the frame 3. It then interacts with the clamping mechanism 7.

The clamping mechanism 7 has several clamping elements 71 that are evenly distributed around the shaft 4 and/or the displacement axis 2. The clamping elements 71 can each be reversibly adjusted from the basic state to the clamping state. A distance (not shown) of the clamping elements 71 from the shaft 4 and/or the displacement axis 2 is at least partially smaller in the basic state than in the clamping state.

When the shank 4 is displaced in the displacement direction 42, the adjusting element 5 comes into contact with the clamping elements 71. In so doing, the adjusting element 5 pushes the clamping elements 71 apart due to its conical shape so that the distance between the clamping elements 71 and the shank 4 is at least partially increased. When the clamping mechanism 7 engages in the auxiliary bore 104 of the knife holder 103, the clamping elements 71 are thereby pressed against an inner wall (not designated) of the auxiliary bore 104 and the clamping mechanism 7 is thus clamped in the auxiliary bore 104. When the shank 4 is pushed back against the displacement direction 42, the adjusting element 5 is pushed back with the shank 4. This causes the adjusting element 5 to disengage from the clamping mechanism 7, thereby returning the clamping elements 71 from the clamping state to the basic state. As a result, the clamping elements 71 are no longer in contact with the inner wall of the auxiliary bore 104. The tool 1 can then be removed from the knife holder 103.

The tool 1 also has a positioning device 6. The positioning device 6 is provided for positioning the chopping knife 101 on the chopping drum 10. For this purpose, the positioning device 6 is arranged at a first end 45 of the adjusting element 5 projecting beyond the clamping mechanism 7. As a result, the positioning device 6 can engage in a counter-positioning device 102 of the chopping knife 101 when the clamping mechanism 7 is inserted into the auxiliary bore 104. When the positioning device 6 engages in the counter-positioning device 102, the chopping knife 101 is therefore displaced into a defined position (not shown) by the adjustment of the clamping mechanism 7 from the basic state into the clamping state, and the chopping knife 101 is thereby displaced into an assembly position (not shown).

The positioning device 6 and the counter-positioning device 102 are designed to correspond to each other in terms of their shape and dimensions. In the present embodiment, the positioning device 6 is designed as a cylindrical mandrel that tapers towards its open end. The counter-positioning device 102 can accordingly be designed as a cylindrical recess, in particular a through-hole.

At its tapered end (not indicated), the adjusting element 5 has approximately the diameter (not indicated) of the shaft 4. At its first end 45 opposite the tapered end, the diameter is therefore larger than that of the shaft 4, where the positioning device 6 adjoins the adjusting element 5 with a diameter approximately corresponding to the diameter of the shaft 4. The diameter of the adjusting element 5, which is larger than the diameter of the shank 4, forms a stop 54 when the tool 1 is inserted into the auxiliary bore 104 of the knife holder 103. The stop 54 limits a depth at which the positioning device 6 engages in the counter-positioning device 102. When the tool 1 is positioned on the knife holder 103, the stop 54 rests against a surface (not designated) of the chopping knife 101.

The shaft 4, the adjusting element 5, and the positioning device 6 are manufactured in one piece and extend along the displacement axis 2. The shaft 4, the adjusting element 5, and the positioning device 6 are rotationally symmetrical. The shaft 4 passes through the center of the clamping mechanism 7. The shaft 4 also passes completely through the clamping mechanism 7.

The shaft 4 retains its centric arrangement since the clamping mechanism 7 is arranged concentrically to the displacement axis 2 and the distance between the clamping elements 71 increases equally when the clamping mechanism 7 is adjusted from the basic state to the clamping state. The position of the auxiliary bore 104 on the knife holder 103 therefore determines the defined position into which the chopping knife 101 is displaced by the positioning device 6 when the tensioning mechanism 7 is tensioned.

In an alternative embodiment, which is not shown here, the clamping mechanism 7 itself can be used as positioning device 6.

To move the shaft 4, the tool 1 comprises a manually operable actuator 8. The actuator 8 is here designed as a rotary knob 8. In the embodiment shown in FIG. 2, the terms actuator 8 and rotary knob 8 are used synonymously. The tool 1 can therefore be operated with one hand. The rotary knob 8 can be rotated about an axis of rotation, which in this case corresponds to the displacement axis 2, in a direction of rotation 83 relative to the frame 3. It is provided in alignment with the displacement axis 2 and the shaft 4. The rotary knob 8 is arranged at a second end 46 of the shaft 4 opposite the first end 45 of the adjusting element 5, at which the positioning device 6 is arranged. The rotary knob 8 has a thread (not designated) which interacts with a counter-thread 43 on the shaft 4 so that the shaft 4 is displaced in the displacement direction 42 when the rotary knob 8 is rotated in the direction of rotation 83.

In the embodiment shown here, the conical adjusting element 5 tapers at a very shallow angle (not shown). When the adjusting element 5 is pushed into the clamping mechanism 7, the clamping elements 71 with the adjusting element 5 are pushed apart. Due to the flat conical shape of the adjusting element 5, it rests against an inner surface (not indicated) of the clamping elements 71, at least in some areas. The clamping mechanism 7 can as a result be clamped in the auxiliary bore 104 with only a small amount of force. This means that the rotary knob 8 only needs to be turned with a small amount of force in order to clamp the clamping mechanism 7 in the auxiliary bore 104.

When the rotary knob 8 is actuated against the direction of rotation 83, it is rotated relative to the shaft 4. This causes the rotary knob 8 to lift away from the frame 3 in the displacement direction 42. In return, the shaft 4 is secured against rotation relative to the frame 3. As a result, the shaft 4 does not rotate with the rotary knob 8 when it is turned. The shaft 4 can then be displaced against the displacement direction 42 by pressing on the rotary knob 8. This causes the adjusting element 5 to disengage from the clamping elements 71, which automatically return from the clamping state to the basic state.

The anti-rotation lock 40 (see (c) of FIG. 2) here comprises a flat cut-out 32 on opposite sides of the shaft 4, in each of which an integrally formed part 41 arranged in a fixed position on the tool 1 engages. The shank 4 cannot be rotated about the displacement axis 2 cue to the engagement of the integrally formed parts 41 in the cut-outs 32.

The tool 1 also has a holding device 9 for holding the tool 1 during actuation of the actuator 8. The holding device 9 is fixed to the frame 3. It can be operated with one hand. This allows the tool 1 to be held with one hand of a fitter when actuating the actuator 8, while the fitter actuates the actuator 8 with his other hand.

In this embodiment of the tool 1, the holding device 9 is designed as a lever-shaped handle.

FIG. 2 (*d*) shows the tool 1 attached to the knife holder 103 when mounting the chopping knife 101.

During pre-assembly, the chopping knife 101 is positioned relative to the knife holder 103 so that the counter-positioning device 102 of the chopping knife 101 and the auxiliary bore 104 of the knife holder 103 overlap each other to such an extent that the positioning device 6 can be inserted into the counter-positioning device 102. A final positioning of the chopping knife 101 is then carried out with the tool 1, which is placed against the knife holder, whereby the clamping mechanism 7 is inserted into the auxiliary bore 104.

The pre-assembled chopping knife 101 is arranged below the knife holder 103. It has the counter-positioning device 102, into which the positioning device 6 is inserted when the clamping mechanism 7 is inserted into the auxiliary bore 104. The counter-positioning device 102 is here designed as a through-bore. To hold the chopping knife 101 in place, a counter strip is arranged below the chopping knife 101 as counter element 105, which is fastened via screws 106 so that the chopping knife 101 is pre-assembled, i.e., still displaceable.

By turning the actuator 8, the shank 4 is displaced in the displacement direction 42 so that the adjusting element 5 engages with the clamping elements 71 of the clamping mechanism 7 and presses them outwards until they at least partially abut against the inner wall of the auxiliary bore 104 and the clamping mechanism 7 is clamped in the auxiliary bore 104. The shaft 4 is positioned centrally in the auxiliary bore 104 and the chopping knife 101 is moved into the defined position via the positioning device 6. The screws 106 can then be tightened and the chopping knife 101 can thus be fixed between the knife holder 103 and the counter element 105. Since the chopping knife 101 is fixed by the tools 1, the screws 106 can be tightened without the chopping knife 101 slipping.

FIG. 2 (*d*) shows the tool 1 when the clamping mechanism 7 is set to the clamping state. By pushing the shank 4 back against the displacement direction 42, i.e., by turning the actuator 8 back against the direction of rotation 83, the clamping mechanism 7 is reset to the basic state. The tool 1 can then be removed from the knife holder 103.

Two such tools 1 are advantageously used to mount a chopping knife 101. Two spaced-apart auxiliary bores 104 on the knife holder 103 and counter-positioning device 102 on the chopping knife 101 are used for this purpose. The second tool 1 is used to position the chopping knife 101 in the manner described above. The chopping knife 101 is positioned in a defined manner at two positions as a result, i.e., along its longitudinal extent, during final assembly.

Figure 3:
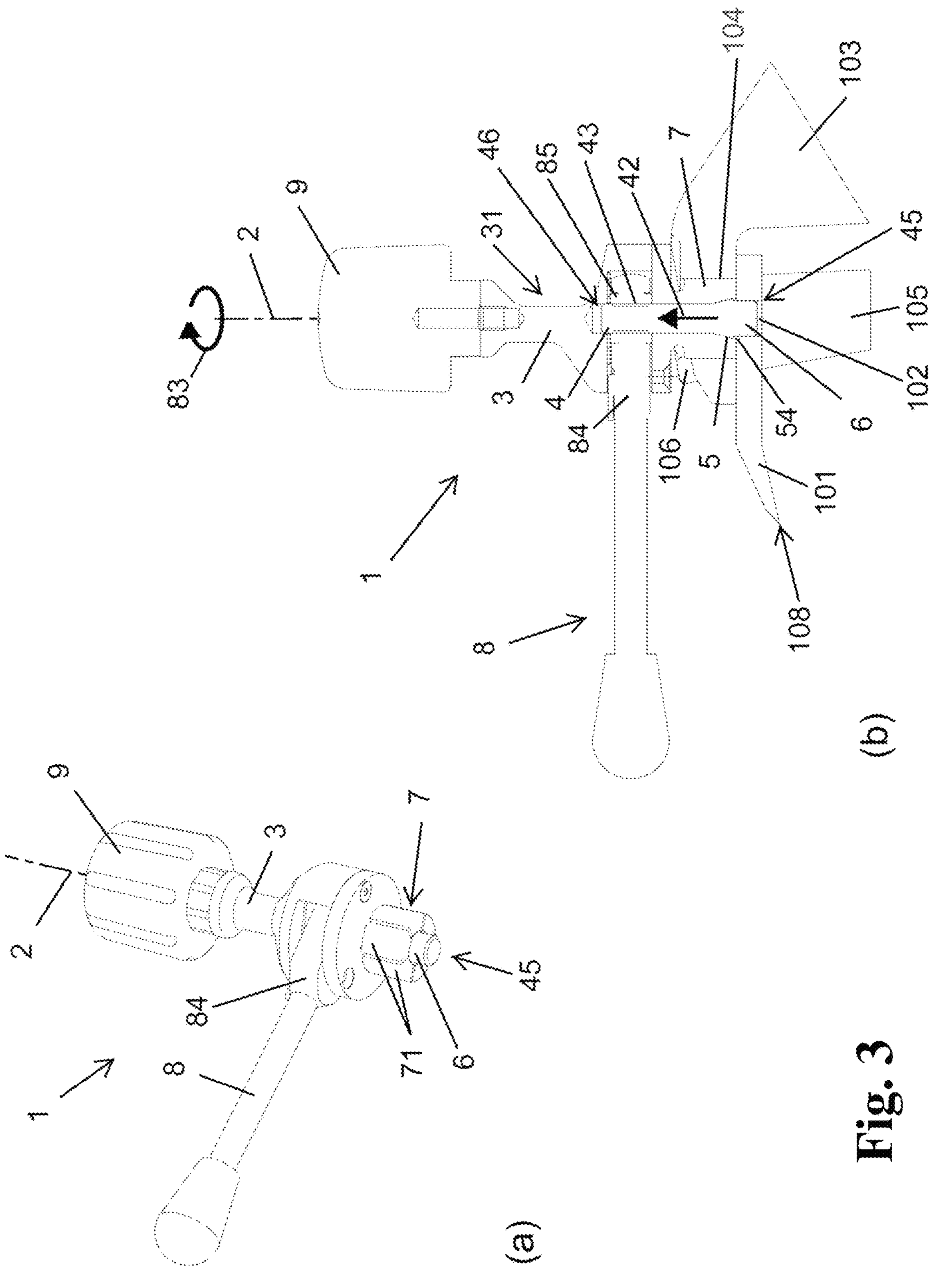
FIG. 3 schematically shows in (a) a perspective view and in (b) a sectional view of a second embodiment of a tool according to the present invention.

FIG. 3 shows a further embodiment of a tool 1 where (a) shows a perspective view of the tool 1 while (b) shows the tool 1 applied to the knife holder 103 when mounting the chopping knife 101.

The tool 1 of the second embodiment differs from the first embodiment in the actuator 8 and the holding device 9. Compared to the first embodiment shown in FIG. 1, the arrangements of the actuator 8 and the holding device 9 are here reversed.

The actuator 8 is also designed as a lever 8, which is arranged projecting laterally on the shaft 4. In the embodiment shown in FIG. 3, the terms actuator 8 and lever 8 are used synonymously. It can be rotated in and against the direction of rotation 83 about the displacement axis 2. A switching device, in this case a ratchet 84, is arranged on the lever 8. The ratchet 84 is switchable in a known manner. The ratchet 84 interacts with a threaded sleeve 85 which has a thread that interacts with the counter-thread 43 of the shaft 4. This is secured against rotation in the manner already described.

In a first switching position of the ratchet 84, the shaft 4 is displaced in the displacement direction 42 by turning the lever 8 in and against the direction of rotation 83. After switching the ratchet 84 to a second switching position, the shaft 4 is displaced against the displacement direction 42 by turning the lever 8 in and against the direction of rotation 83.

The holding device 9 is also designed as a button-shaped handle and is aligned with the shaft 4. Both the lever 8 and the handle 9 can be operated with one hand so that the tool 1 can be held by the handle 9 with the other hand when operating the lever 8 with one hand.

Analogous to the first embodiment (see FIGS. 1 and 2), when the shaft 4 is moved by actuating the lever 8, the clamping mechanism 7 is adjusted via the conical adjusting element 5, whereby the clamping mechanism 7 is clamped in the auxiliary bore 104. The chopping knife 101 is thereby displaced into the assembly position via the positioning device 6 engaging in the counter-positioning device 102.

Figure 4:
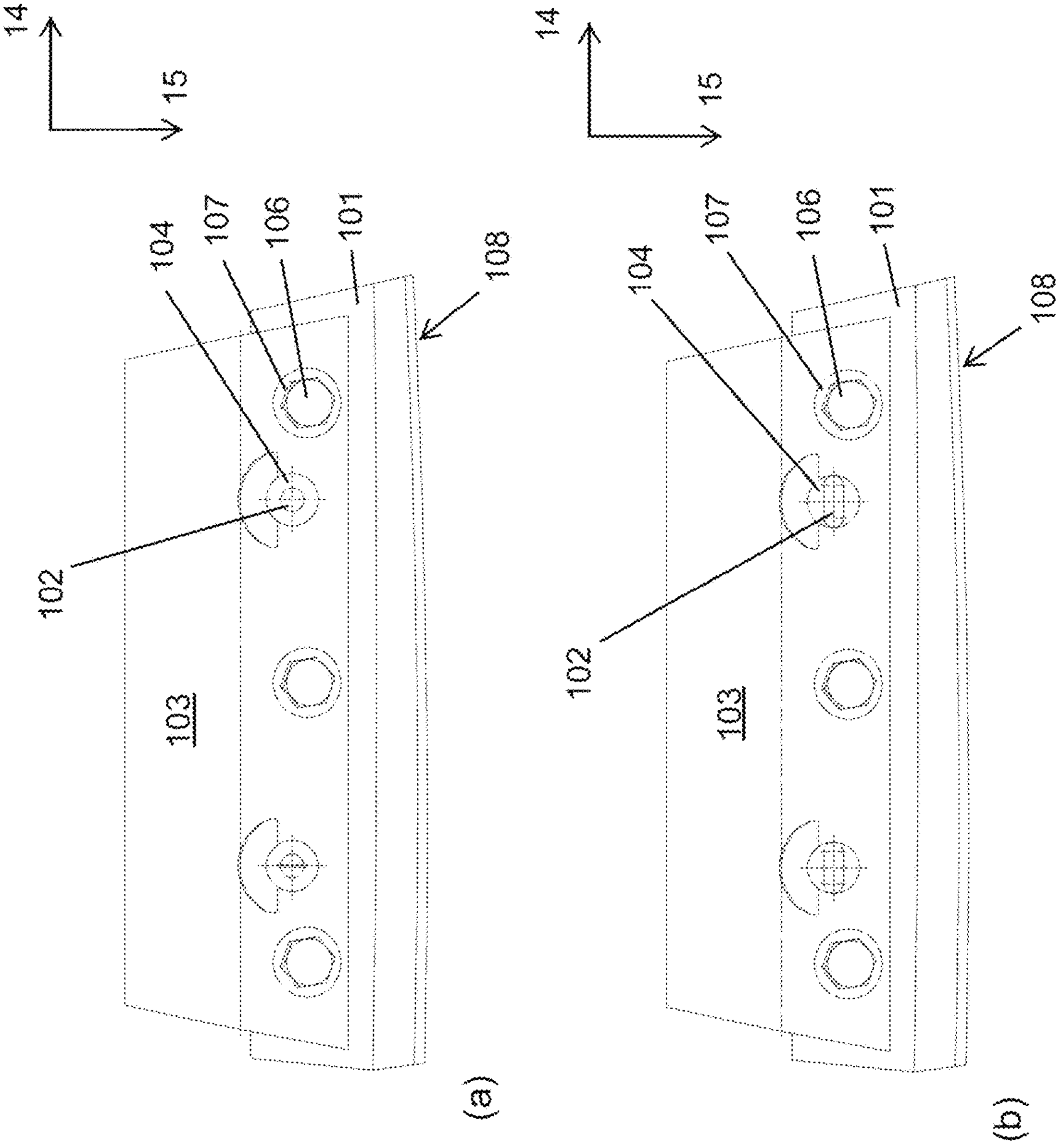
FIG. 4 schematically shows in (a) and (b) in each case an embodiment of a chopping knife arranged on a knife holder in a perspective view.

FIG. 4 shows a perspective view of a knife holder 103 with chopping knife 101 mounted on the knife holder 103. The chopping knife 101 of (a) of FIG. 4 differs from the chopping knife 101 of (b) of FIG. 4 in the design of the counter-positioning device 102.

The chopping knife 101 of FIG. 4 (*a*) has a first and a second counter-positioning device 102, each of which are designed as a circular through-bore in cross-section. The knife holder 103 has a first and a second auxiliary bore 104, each of which are also designed as circular through-bores in cross-section. The auxiliary bores 104 and the counter-positioning device 102 are arranged offset at the same distance from one another in a longitudinal direction 14 in which the chopping knife 101 and the knife holder 103 extend. They are therefore arranged in alignment with one another in the final assembled state of the chopping knife 101 on the knife holder 103, which is shown in FIG. 4 (*a*) and (*b*). A diameter of the auxiliary bores 104 is in each case larger than a diameter of the counter-positioning device 102 so that the auxiliary bores 104 can each accommodate the clamping mechanism 7 of a tool 1 and the counter-positioning device 102 can each accommodate the positioning device 6 of a tool 1.

The chopping knife 101 is fixed to the knife holder 103 via screws 106. The knife holder 103 has through-bores 107 to accommodate the screws 106 for this purpose. So that the screws 106 do not obstruct the crop flow, the screws 106 are lowered on the knife holder 103. The chopping knife 101 also has through-bores (not shown) to accommodate the screws 106 which are aligned with those of the knife holder 103. The screws 106 are screwed into threaded holes (not shown) of the counter element 105 (see FIGS. 2(*d*) and 3(*b*)), which are also arranged in alignment with the through bores 107 of the knife holder 103 and the chopping knife 101. The chopping knife is therefore frictionally and/or positively fixed between the counter element 105 and the knife holder 103. As the through-bores in the chopping knife 101 are designed as elongated holes which extend in a transverse direction 15 transverse to the longitudinal direction 14, the chopping knife 101 can deflect in the transverse direction 15 if it strikes an obstacle (not shown) with its cutting edge 108, or if a foreign object strikes the chopping knife. Damage to the chopping knife 101 and/or the chopping drum 10 can thereby be avoided.

By using two tools 1 simultaneously when mounting the chopping knife 101, the chopping knife 101 is aligned at two positions spaced apart from each other in the longitudinal direction 14. A constant cutting gap 109 (see FIG. 1) can thereby be repeatedly, easily and precisely created with the tool 1 for all chopping knives 101.

In contrast to the embodiment of FIG. 4 (*a*), the chopping knife 101 of FIG. 4 (*b*) has a first and a second counter-positioning device 102, which are each designed as slotted holes that extend in the transverse direction 15. The mounting position of the chopping knife 101 in this embodiment can be adjusted in the transverse direction 15, for example, to compensate for tolerances.

The present invention is not limited to embodiments described herein; reference should be had to the appended claims.

LIST OF REFERENCE NUMERALS

1 Tool
2 Displacement axis
3 Frame
4 Shaft
5 Adjusting element
6 Positioning device
7 Clamping mechanism
8 Actuator/Rotary knob/Lever
9 Holding device
10 Chopping drum
11 Counter blade
12 Direction of rotation
13 Axis of rotation
14 Longitudinal direction
15 Transverse direction
31 Recess
32 Cut-out
40 Anti-rotation lock
41 Integrally formed part
42 Displacement direction
43 Counter-thread
45 First end
46 Second end
54 Stop
71 Clamping element
83 Direction of rotation
84 Ratchet
85 Threaded sleeve
101 Chopping knife
102 Counter-positioning device
103 Knife holder
104 Auxiliary bore
105 Counter element

106 Screw
107 Through-bore
108 Cutting edge
109 Cutting gap
111 Adjustment direction

What is claimed is:

1. A tool for mounting a chopping knife to a chopping drum, the tool comprising:

a clamping mechanism for releasably fixing the tool in an auxiliary bore of the chopping drum, the clamping mechanism being configured to be reversibly adjustable from a basic state, in which the clamping mechanism is unclamped, to a clamping state, in which the clamping mechanism is clamped;

a frame;

an adjusting element which is reversibly displaceable relative to at least one of the clamping mechanism and the frame in a displacement direction along a displacement axis, the adjusting element being configured to reversibly adjust the clamping mechanism from the basic state to the tensioned state; and a positioning device which is configured to position the chopping knife on the chopping drum.

2. The tool as recited in claim 1, wherein, the positioning device is arranged at a first end of the adjusting element which projects beyond the clamping mechanism, or the clamping mechanism forms the positioning device.

3. The tool as recited in claim 1, wherein, the clamping mechanism comprises at least two clamping elements, and at least one of the at least two clamping elements is adjustable relative to the displacement axis.

4. The tool as recited in claim 1, wherein the adjusting element has a conical shape and tapers in or towards the displacement direction.

5. The tool as recited in claim 1, further comprising:

a shaft which is arranged to pass centrally through the clamping mechanism, wherein, the adjusting element is arranged on the shaft.

6. The tool as recited in claim 5, wherein the shaft is secured against a rotation relative to the frame.

7. The tool as recited in claim 5, wherein at least one of the shaft, the adjusting element, and the positioning device are designed to be rotationally symmetrical to the displacement axis.

8. The tool as recited in claim 5, further comprising:

an actuator which is manually operable, the actuator being configured to displace at least one of the adjusting element and the shaft relative to the frame.

9. The tool as recited in claim 8, wherein the actuator is designed as a rotary knob or as a lever.

10. The tool as recited in claim 8, wherein, the actuator comprises a thread, the shaft comprises a counter-thread, and the thread of the actuator is configured to interact with the counter-thread of the shaft so that the shaft is displaced in the displacement direction when the actuator is rotated in or against a direction of rotation.

11. The tool as recited in claim 8, further comprising:

a holding device which is configured to hold the tool during an actuation of the actuator.

12. A method for mounting a chopping knife on a chopping drum, the method comprising:

positioning the chopping knife on the chopping drum using the tool as recited in claim 1;

subsequently fixing the chopping knife to the chopping drum via the tool; and then releasing the tool from the chopping drum.

13. The method as recited in claim 12, wherein the subsequently fixing of the chopping knife to the chopping drum via the tool is performed via screwing.

14. A method for mounting a chopping knife to a chopping drum via a first tool, wherein, the tool comprises:

a clamping mechanism for releasably fixing the first tool, the clamping mechanism being configured to be reversibly adjustable from a basic state, in which the clamping mechanism is unclamped, to a clamping state, in which the clamping mechanism is clamped;

a frame;

an adjusting element which is reversibly displaceable relative to at least one of the clamping mechanism and the frame in a displacement direction along a displacement axis, the adjusting element being configured to reversibly adjust the clamping mechanism from the basic state to the tensioned state; and a positioning device which is configured to position the chopping knife on the chopping drum, the chopping drum comprises at least one knife holder, the chopping knife is mountable to the at least one knife holder, the at least one knife holder comprises a first auxiliary bore, and the chopping knife comprises a first counter-positioning device, the method comprising:

inserting the clamping mechanism of the first tool into the first auxiliary bore, the clamping mechanism of the first tool being in the basic state so that the positioning device of the first tool engages with the first counter-positioning device of the chopping knife; and transferring the clamping mechanism of the first tool from the basic state to the clamping state via the clamping mechanism of the first tool being braced in the first auxiliary bore and the positioning device of first tool being adjusted relative to the first auxiliary bore.

15. The method as recited in claim 14, wherein the positioning device of first tool is adjusted by being centered relative to the first auxiliary bore.

16. The method as recited in claim 14, further comprising:

preassembling the chopping knife on the at least one knife holder before inserting the clamping mechanism into the first auxiliary bore.

17. The method as recited in claim 16, wherein the preassembling of the chopping knife on the at least one knife holder before inserting the clamping mechanism into the first auxiliary bore is performed loosely.

18. The method as recited in claim 14, wherein, a second tool is used to mount the chopping knife to the chopping drum, the second tool comprising:

a clamping mechanism for releasably fixing the second tool, the clamping mechanism being configured to be reversibly adjustable from a basic state, in which the clamping mechanism is unclamped, to a clamping state, in which the clamping mechanism is clamped;

a frame;

an adjusting element which is reversibly displaceable relative to at least one of the clamping mechanism and the frame in a displacement direction along a displacement axis, the adjusting element being configured to reversibly adjust the clamping mechanism from the basic state to the tensioned state; and a positioning device which is configured to position the chopping knife on the chopping drum, the at least one knife holder further comprises a second auxiliary bore, and the chopping knife further comprises a second counter-positioning device, and the method further comprises:

inserting the clamping mechanism of the second tool into the second auxiliary bore, the clamping mechanism of the second tool being in the basic state so that the positioning device of the second tool engages with the second counter-positioning device of the chopper knife; and transferring the clamping mechanism of the second tool from the basic state to the clamping state via the clamping mechanism of the second tool being braced in the second auxiliary bore and the positioning device of the second tool being adjusted relative to the second auxiliary bore.

19. The method as recited in claim 18, wherein the positioning device of second tool is adjusted by being centered relative to the second auxiliary bore.

20. The method as recited in claim 18, further comprising:

subsequently fixing the chopping knife to the at least one knife holder.

21. The method as recited in claim 20, wherein the subsequently fixing of the chopping knife to the at least one knife holder is preformed via screwing.

22. The method as recited in claim 18, further comprising:

releasing the first tool from the chopping drum after the fixing of the chopping knife by transferring the clamping mechanism of the first tool from the clamping state to the basic state; and releasing the second tool from the chopping drum after the fixing of the chopping knife by transferring the clamping mechanism of the second tool from the clamping state to the basic state.

* * * * *